United States Patent Office 3,338,145
Patented Aug. 29, 1967

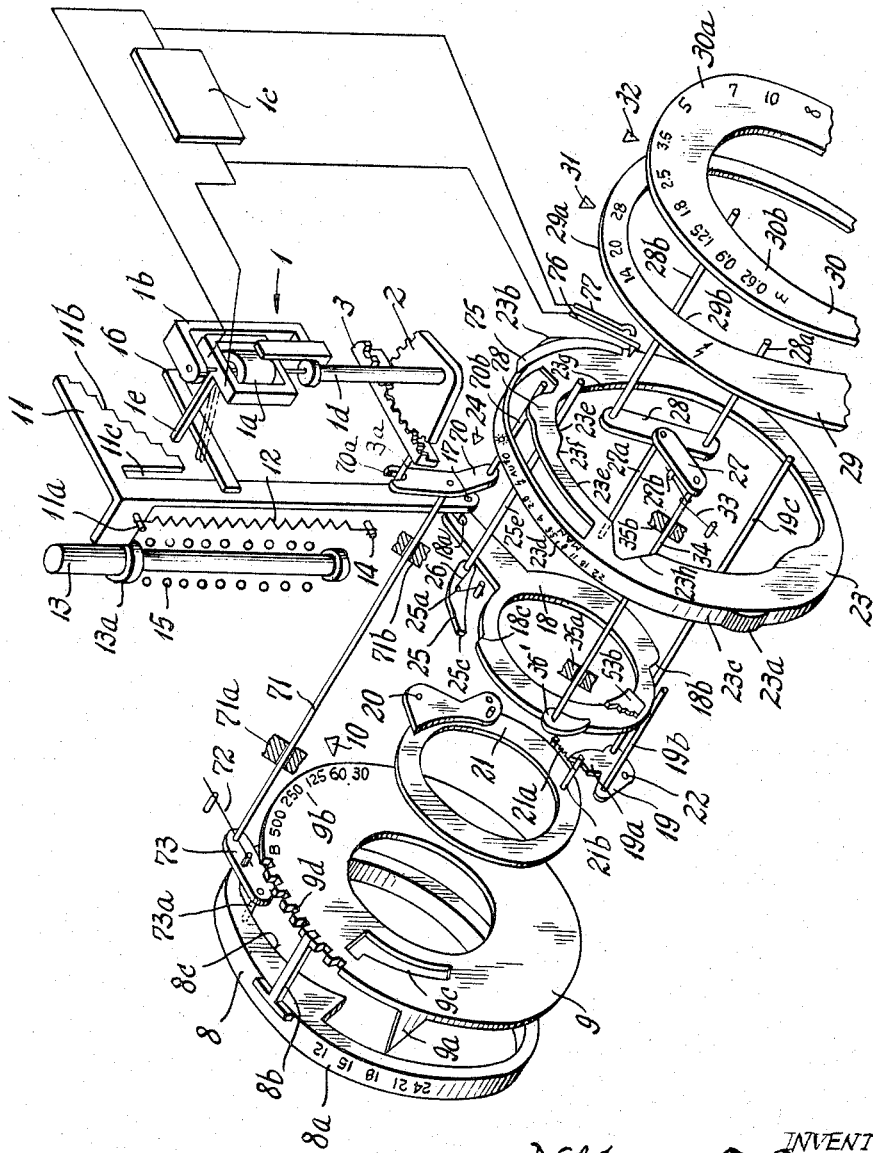

3,338,145
PHOTOGRAPHIC CAMERA WITH
LIGHT METER
Waldemar T. Rentschler, Franz W. R. Starp, and Erwin Weller, Calmbach, Black Forest, Germany, assignors to Prontor-Werk Alfred Gauthier G.m.b.H., Calmbach, Black Forest, Germany, a corporation of Germany
Filed Nov. 9, 1965, Ser. No. 506,992
Claims priority, application Germany, Nov. 11, 1964, G 41,990
7 Claims. (Cl. 95—10)

ABSTRACT OF THE DISCLOSURE

A photographic camera having an attached or built in light meter with automatic or manual diaphragm setting features in both the daylight and flash ranges of the camera. The camera is provided with a distance setting member and a guide number setting member and a differential having two input members and an output member. The input members are associated with the distance and guide number setting members. A catch lever is provided which is attached to the output member of the differential for engagement with a stepped cam mounted on a ring setting member. Further, a follower is provided having a stepped surface to contact the indicator of the light meter which is adapted so that the follower actuates the setting ring. The shutter release rod is provided with a compression spring to restore the release rod after being depressed, and a tension spring is provided to retain the follower in contact with the release rod. In addition, a setting member is provided to place the camera in different modes of operation without changing the setting of the guide number setting member. This setting member includes a cam surface for engaging an electrical switch comprising two normally open contact springs provided in the light meter circuit adapted to be closed by the cam surface upon engagement with the contact springs.

---

This invention is a continuation-in-part of application #384,908 filed July 24, 1964 and relates to a photographic camera having an attached or built-in light meter, and which has automatic or manual diaphragm setting features in both the daylight and flash ranges of the camera.

In photographic cameras, heretofore, the adaptation of the setting characteristics for the distance setting mechanism to those of the guide number and the diaphragm mechanism, was required to be made in the shutter mechanism of the exposure lens. Advantages could be had in the form of a simpler and less costlier mechanism, if such adaptation is made to the mechanical linkage that transfers to the diaphragm the inserted values for guide number and distance. Such arrangement, for example, is possible through proper formation of a cam curve which serves to furnish the distance value to an input of a differential mechanism.

It is an object of this invention, therefore, to provide a camera with automatic setting of the diaphragm in the flash region, by coupling the guide number and distance setting members to the diaphragm through means of a differential.

It is another object of this invention to provide the aforementioned camera with a member which indicates settings of "Daylight-Automatic," "Flashlight-Automatic," and "Manual."

A further object of this invention is to provide single lens reflex cameras, with a catch lever at the output member of the differential, such that the catch lever cooperates with a stepped form of a setting member coupled to the diaphragm. The stepped function is associated in the "Daylight-Automatic" range with the follower of the movable setting ring of the light meter indicator. This arrangement eliminates linkage for positioning the diaphragm, which is active only in the flash region of the camera.

A still further object of this invention is to provide additional simplification of the mechanism for automatic setting of the diaphragm in the daylight and flash regions of the camera.

Other objects and advantages are set forth in greater detail in the following specification taken in conjunction with the accompanying drawing which is a perspective view showing the assembly of the various linkages, setting members and cooperating parts.

The reference numerals employed to identify the parts in the drawing are identical to those used in the aforementioned application #384,908 for similar parts. Accordingly, the photoelectric light meter is denoted by 1 and its coil by 1a. The coil is held by a supporting frame 1b in which it is free to rotate. The coil may be actuated with current originating from a photoelectric cell 1c. A cantilever shaft 1d is coaxially associated with the coil 1a. The shaft 1d cantilevers in the respect that it has a free end which is not supported by a housing-seated bearing. A gear segment 2 is fastened to the free end of the cantilever shaft 1d. The gear segment meshes with a gear rack 3. The gear rack bears a pin 3a which engages the fork-formed end 70a of a two-armed positioning lever 70.

The positioning lever 70 is fastened to one end of a shaft 71 which is rotatable within bearings 71a and 71b. A one-armed follower-lever 73 is fastened to the other end of the shaft 71. A coil spring 72 affects the follower-lever 73 in the respect that it exerts upon the lever a clockwise torque. To the free end of the follower-lever 73 is attached a pin 73a. Due to the action of spring 72 upon the lever 73, pin 73a is brought to bear against the cam edge 8c which takes into account the film speed factor as determined by the setting member 8. The film speed setting member 8 includes a scale 8a which may be positioned in relation to an indicator 9a attached to and positioned in accordance with the exposure time setting member 9. The scale 9b of the exposure time setting member 9, is associated with an indicator 10 fixed to the housing of the camera. A sprocket mechanism consisting of stop 8b and sprocket segment 9d, is provided to allow firm coupling of the setting members 8 and 9 in different relative positions.

The coil 1a of light meter 1 bears an indicator which shows the light intensity taking into account at the same time, the pre-set values of the film speed and exposure time. A follower 11 is operated in the customary manner in conjunction with indicator 1e. Due to the tension spring 12, follower 11 is held against a shoulder 13a of the camera release rod 13. Tension spring 12 is gripped at one end by the fixed pin 14, and at the other end by pin 11a of the follower 11. A compression spring surrounds the release rod 13. The magnitude of the tension in spring 12 is chosen in relation to spring 15, such that follower 11 cannot alter its position from the one shown in the drawing, until release rod 13 is pressed downward. To operate in conjunction with the indicator 1e, follower 11 possesses a stepped-function curve 11b which engages indicator 1e with one of its steps, upon depression of release rod 13 through spring 12. Indicator 1e is supported by fixed link 16 during this process.

As disclosed further by the drawing, follower 11 possesses a pin 17 which engages a slot 18a of a coaxial positioning member 18. This positioning member 18 bears a cam edge 18b. This cam edge causes the positioning of ring member 21 as a result of, for example, the three-armed lever 19 which serves to actuate the diaphragm lamella 20. The positional member 21 which is acted upon in a counter-clockwise manner due to tension spring 21a, carries a pin 21b which bears against the arm 19a of lever 19, as a result of the action of spring 21a. The lever 19 is rotatable about a pivot 22 fixed to the housing of the camera. The lever carries a follower rod 19b which bears against cam edge 18b of the positional ring 18, as a result of the action of tension spring 21a.

A setting member 23 provided with knurled gripping areas 23a and 23b, is located along the same axis as setting members 8 and 9 corresponding to film speed and exposure time respectively. The member 23 is set in relation to a fixed indicator 24, and is provided for the purpose of selecting the different camera operating modes consisting of either automatic or manual diaphragm setting in the daylight and flash regions.

The rim 23c of the setting member 23 exhibits a sun symbol as well as a flash symbol in conjunction with the marking "AUTO." These symbols correspond to "Daylight-Automatic" and "Flash-Automatic" regions of the camera, and imply automatic diaphragm setting when the camera is set to either one of these modes of operation. Upon setting the member 23 to the position corresponding to the sun symbol, the diaphragm mechanism represented by parts 20 and 21 becomes set depending on the positions of parts 11, 18, and 19 set by the light meter 1. When release rod 13 is thereupon depressed, the cam surface 18b acts upon setting member 21 through lever 19 until one of the steps 11b of the follower 11, engages the indicator 1e.

When member 23 is set to the position corresponding to the flash symbol, the aforementioned parts 11, 18, and 19 become operable upon the actuation of release rod 13 for the purpose of releasing the camera shutter. For this case provisions have been made through the action of light meter 1 as previously explained in detail—that follower 11 may undergo the full stroke without interference from indicator 1e during the release process.

In order to set the diaphragm so that it corresponds to a given guide number when member 23 is set to "Flash-Automatic," a differential mechanism is provided as described in detail in the referenced application of which this is a continuation-in-part of. This differential mechanism operates in conjunction with the setting members that serve to take into account the factors guide number and distance. As already mentioned, a "Manual" setting range is additionally provided in conjunction with the two modes of operation—"Daylight-Automatic" and "Flash-Automatic." This "Manual" setting range is denoted by the term "MAN" on the diaphragm scale 23d. In the event that the camera is set to this particular range, the setting ring 18 which is subject to the motion of follower 11, must be locked in its null position for both of the aforementioned ranges. For this purpose a blocking lever 25 held by a fixed pin 25a, is provided. The lever is subject to the counterclockwise effect of spring 26, and possesses a bearing edge 25c which cooperates with the projection 18c of the setting ring 18.

The blocking action of lever 25 takes place when the follower shaft 25e attached to the other end of lever 25, follows the cam edge 23e formed as part of the setting member 23. Cam edge 23e is essentially provided for the "MAN" setting range as well as for the setting ranges denoted by the sun and flash symbols. The portions of the cam edge are situated in a concentric manner about the optical axis. A cam rise 23f serves as a means of transition between the cam surfaces.

If the camera is set in accordance with the designation, "Daylight-Automatic," the follower shaft 25e bears against the cam edge 23e, and the bearing edge 25c of blocking lever 25 lies outside of the path of motion of projection 18c. If setting member 23 is now rotated clockwise to set the camera to the "Flash-Automatic" range, the position of the blocking lever 25 remains unaltered. Only then, when setting member 23 is first moved beyond this range, does the follower shaft 25e come into the region in which the deeper section of cam edge 23e lies. The result of this is that bearing edge 25c of lever 25 becomes situated before projection 18c of setting ring 18, and this causes the blocking of the assembly of parts 11, 18, and 19. Manual setting of the diaphragm is obtained by means of the controlling curve 23g of the setting member 23. Follower shaft 19c of lever 19 bears against this controlling curve as a result of the action of spring 21a of setting member 21.

For automatic setting of the diaphragm during flash exposures, a differential mechanism is provided from essentially the lever 27 and scaling beam lever 28. The scaling beam lever 28 engages the movable shaft 27a of the lever 27, and cooperates with the guide number setting member 29 as well as the setting member 30 which serves to take into account distance values. Member 29 may be set by means of the guide number scale 29a located across a fixed indicator 31. Similarly, a distance scale 30a in association with a fixed indicator 32, serves the purpose of allowing the setting of member 30. Each one of the setting members 29 and 30, is provided with a cam surface 29b and 30b respectively. These cam surfaces cooperate with the scaling beam lever 28 which includes for this purpose, the two follower shafts 28a and 28b.

The ends of the follower shafts 28a and 28b are held in contact with cam surfaces 29b and 30b respectively, as a result of coil spring 33 which grips pin 27b of lever 27. The lever arm 27 is itself fastened to a shaft 34 which is held so that it may freely rotate within fixed bearings 35a and 35b. At the free end of shaft 34, is located a catch lever 36' which cooperates with the stepped curve 53b provided on setting ring 18. Depending upon the preset values of both of the members for guide number and distance, the catch lever is always situated in the position so that it will engage sooner or later the moving stepped curve during the release process. In this manner it is assured that setting ring 18 will become located in a definite given position.

In order to assure that the motion of follower 11 is not hindered by indicator 1e during the operating mode, "Flash-Automatic," setting member 23 is provided with a cam profile 75 projecting at the rim. This cam profile cooperates with a normally open single-pole single-throw switch composed of springs 76 and 77 shown in the drawing in diagrammatic form.

The circuit of this switch is associated with that of the light meter 1, and is arranged with respect to cam profile 75 so that contact closure results upon setting the member 23 to the position in which the flash symbol is situated opposite the fixed indicator 24. At other times the switch circuit is open. As the indicator 1e changes thereby positions to the one represented by the dashed lines in the drawing, the indicator may freely enter the unobstructed throat 11c when follower 11 is operated as a result of actuating the release rod 13.

In those cameras in which it is customary to take into account the factors film speed and exposure time through corresponding variations in the setting of the instrument frame 1b, it is necessary to take precautions which assure that the given null position of the indicator 1e prevails upon contact closure of the switch. For this purpose another cam profile 78 is provided on setting member 23 in the "Flash-Automatic" setting range. The construction and function of this cam profile is similar to that of cam profile 75. A follower shaft 70b cooperates with cam profile 78, and is attached to lever 70 which is coupled to gear rack 3.

The method of operation of the preceding camera arrangement is as follows:

For the "Daylight-Automatic" range: If release rod 13 is depressed in this particular mode of operation, follower 11 travels along with the rod as a result of the action of spring 12. This causes setting ring 18 to be moved in a clockwise direction. The follower shaft 19b engages thereby the cam rise 18b, and as a result the lever 19 experiences a counter-clockwise rotation about pivot 22. This rotational movement of lever 19 causes, in turn, a clockwise motion of positioning member 21, and a final movement of diaphragm lamella 20. The automatic setting of the diaphragm in this manner, is dependent upon the particular step of follower 11, which is engaged by indicator 1e. If release rod 13 continues to be depressed upon such contact between follower and indicator, the release of the shutter mechanism (not shown) is carried out in the commonly known maner. As soon as rod 13 is let go after the release process, follower 11 and setting ring 18 linked to it, return to their initial positions as a result of the action of spring 15. At the same time tension spring 21a also causes the return of setting member 21 as well as lever 19 to the initial position.

For the "Flash-Automatic" range: When setting member 23 is transferred from the preceding mode of operation to the one corresponding to the flash symbol, cam profiles 75 and 78 become activated. Indicator 1e is thereby returned to its null position due to the action of the switch represented by contact springs 76 and 77. In addition, the instrument frame 1b is moved to a given definite position as a result of the mechanical transmission members 70, 3, and 2, and this produces the effect of locating indicator 1e in line with the open slot 11c.

Upon setting member 23 to the "Flash-Automatic" mode of operation, moreover, follower rod 25e engages the concentric cam edge 23e, and this causes blocking lever 25 to remain inoperable. At the same time, groove 23h is positioned in line with the pivot rod 27a. In this manner pivot rod 27a has freedom of movement to the extent that follower shafts 28a and 28b of scaling beam lever 28, can engage the cam surfaces 29b and 30b of the setting members for guide number and distance respectively. Upon setting these members to given values of guide number and distance, catch lever 36' becomes located in a definite and particular position. Upon actuation of the release rod 13 the motion of which is followed by member 11 as a result of the action of tension spring 12, setting ring 18 becomes rotated clockwise similar to the situation that prevails for daylight exposures. This rotation of setting ring 18 takes place until the stepped curve 53b engages catch lever 36' at one of its steps. This last action marks the end of the process for positioning the diaphragm through this mechanism. If, for purposes of illustration, values of "28" and "3.5" are inserted for the guide number and distance respectively, and release rod 13 is actuated, a diaphragm value of "8" will be obtained with the aid of the differential mechanism composed of links 27, 28, and 34.

For "Manual Setting of the Diaphragm": In order to set the diaphragm manually, it is necessary to rotate member 23 in a clockwise direction if the latter is set in the "Flash-Automatic" mode. Follower shaft 70b of lever 70 is thereby taken from the position at the top of cam rise 78, where it has ben situated until now. Subsequent to these movements, cam curve 8c is re-engaged by control shaft 73a of lever 73 which cooperates with the film speed setting member 8. As a result the instrument frame 1b of the light meter assumes again the position corresponding to the preset value of the film speed. Upon changing the setting of member 23 to the "MAN" operating mode, the control shaft 25e of blocking lever 25 becomes disengaged from the concentric cam edge 23e, by passing along the cam rise 23f and becoming engaged with that section of cam edge 23e which lies further away from the optical axis. This produces the effect that lever 25 becomes situated in a blocking manner with respect to projection 18c, as a result of the action of spring 26.

The further member 23 is now rotated in a clockwise direction, the closer follower shaft 19c approaches the optical axis, due to the rising cam curve 23g. Lever 19 executes, thereby, a counter-clockwise motion, and accordingly arm 19a drives member 21 together with diaphragm lamella 20, against the action of spring 21a and in the direction of decreasing the aperture. If now, member 23 is rotated back in the counter-clockwise direction, member 21 will follow the motion as a result of the action of tension spring 21a in conjunction with the shaft 19c engaging cam edge 23g. This produces the result in which diaphragm lamella 20 changes towards increasing the size of the aperture. The differential mechanism composed of links 27, 28, and 34 which serve to position the diaphragm lamella in the "Flash-Automatic" mode, can also be arranged so as to be effective for manual positioning of the diaphragm. This is accomplished in the manner similar to that of the "Daylight-Automatic" mode in which cam edge 23e provides adequate separation between control shafts 28a and 28b and cam edges 29b and 30b respectively, so as to assure that setting members 29 and 30 are freely movable.

While this invention has been described in some detail, it will be understood by those skilled in the art that variations and modifications may be made without departing from the spirit thereof or the scope of the following claims.

What is claimed is:

1. A photographic camera with built-in or attached light meter comprising: a distance setting member and a guide number setting member; a differential having two input members and an output member, said input members being associated with said distance and guide number setting members respectively; a catch lever attached to the output member of said differential; a stepped cam engaging said catch lever; a ring setting member bearing said stepped cam; a follower having a stepped surface to contact the indicator of said light meter, said follower actuating said setting ring; a shutter release rod; a compression spring to restore said release rod after being depressed; a tension spring to retain said follower in contact with said release rod; a setting member to place said camera in different modes of operation, said member including a cam surface; and an electrical switch comprising two normally open contact springs, said switch being in the light meter circuit and being closed by said cam surface upon engaging said contact springs.

2. The photographic camera of claim 1 wherein said follower has a non-obstructed throat by which the indicator of said light meter may enter when placed in the null position of said indicator and when said follower pursues the motion of said release rod.

3. The photographic camera of claim 2 including a film speed setting member and an exposure time setting member; means to couple the frame of said light meter to said film speed setting member; and another cam surface associated with said setting member for placing the camera in different modes of operation, said cam rise to cause said light meter frame to become located in a given position.

4. The photographic camera of claim 3 wherein said means to couple the frame of said light meter to said film speed setting member comprises; a two-armed lever coupled to the coil of said light meter; a shaft held in fixed bearings and attached at one end to said two-armed lever; a one-arm lever attached to the other end of said shaft; and a coil spring to maintain said one-arm lever in engagement with said film speed setting member.

5. The photographic camera of claim 3 wherein said cam surfaces comprise projections constructed of rising curves followed by falling curves.

6. The photographic camera of claim 1 wherein said switch is of the single-pole, single-throw, normally open type.

7. The photographic camera of claim 3 wherein the frame of said light meter is coupled to said film speed setting member by a mechanical linkage comprising: a positioning lever fixed to a shaft rotatable in fixed bearings; a follower lever associated with said shaft; a follower pin associated with said follower lever; a cam associated with said film speed setting member; and a coil spring forcing said follower pin to bear against said cam associated with said film speed setting member.

References Cited

UNITED STATES PATENTS 3,118,356 11/1964 Sauer et al.
3,162,111 12/1964 Koppen et al. _____ 95—10

NORTON ANSHER, *Primary Examiner.*

J. F. PETERS, *Assistant Examiner.*